Figure 4:
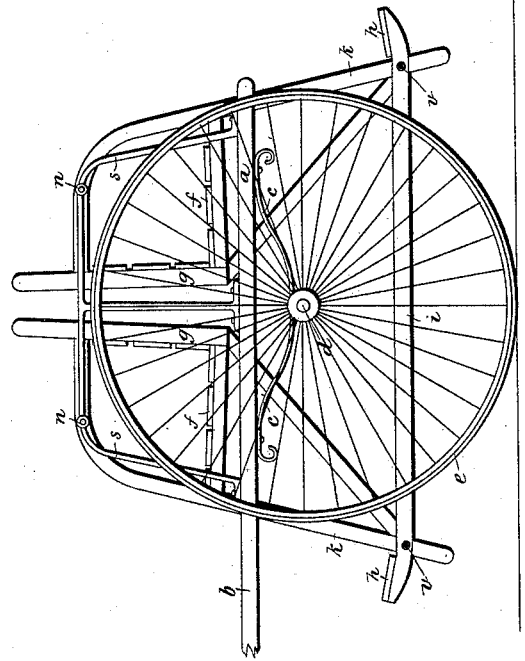

(No Model.) 3 Sheets—Sheet 1.
J. H. & W. TOZER.
CHILD'S CARRIAGE.
No. 432,097. Patented July 15, 1890.
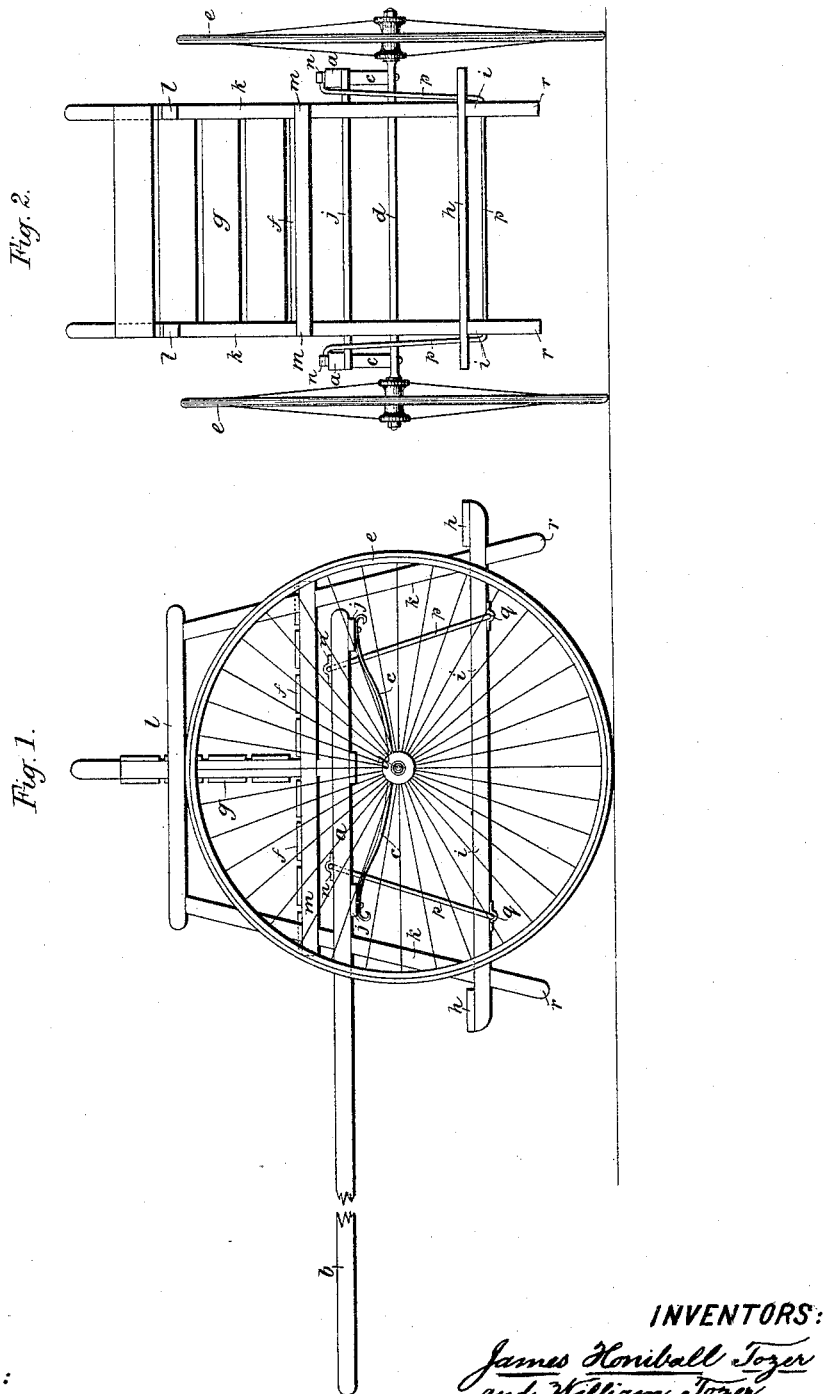
WITNESSES:
John Becker
Fred White
INVENTORS:
James Honiball Tozer
and William Tozer,
By their Attorneys
Arthur E. Fraser & Co.

(No Model.)  3 Sheets—Sheet 2.

J. H. & W. TOZER.
CHILD'S CARRIAGE.

No. 432,097.  Patented July 15, 1890.

WITNESSES:
John Becker
Fred White

INVENTORS:
James Honiball Tozer,
and William Tozer
By their Attorneys:
Arthur C. Fraser & Co.

(No Model.) 3 Sheets—Sheet 3.
J. H. & W. TOZER.
CHILD'S CARRIAGE.

No. 432,097. Patented July 15, 1890.

WITNESSES:
John Becker
Fred White

INVENTORS:
James Honiball Tozer,
and William Tozer,
By their Attorneys
Arthur G. Fraser & Co.

UNITED STATES PATENT OFFICE.

JAMES HONIBALL TOZER AND WILLIAM TOZER, OF LONDON, COUNTY OF MIDDLESEX, ENGLAND.

CHILD'S CARRIAGE.

SPECIFICATION forming part of Letters Patent No. 432,097, dated July 15, 1890.

Application filed May 6, 1890. Serial No. 350,766. (No model.)

*To all whom it may concern:*

Be it known that we, JAMES HONIBALL TOZER and WILLIAM TOZER, both of London, England, are in possession of certain new and useful Improvements in Children's Mail-Carts and other Light Vehicles, of which the following is a specification.

Our invention has reference more particularly to the vehicles known as "children's mail-carts." These vehicles as hitherto generally constructed have had the seat, the back, and the foot-steps firmly and rigidly fixed to the framing of the vehicle. The angle or inclination of the seat, back, and foot-steps therefore varies with the height of the person who propels the vehicle—that is to say, with the height to which such person lifts the shafts—and with the nature of the ground, whether level or inclined, upon which the vehicle is being moved. This angle or inclination is sometimes very considerable, so much so that it is detrimental to the health and comfort of a child or children seated in the vehicle.

Now, the object of our invention is to overcome this objection and to make the vehicle more comfortable both for the occupants and for the person who propels it. For these purposes we make the part which carries the child or children—that is to say, the seat and back and the foot-steps—independent of the main framing of the vehicle, and we provide them with a suspended or balanced swing-like frame-work of their own, so that they will maintain or approximately maintain their normal position notwithstanding the variation in the inclination or angle of the main framing or shafts, according to whether these are held by a tall or short person, an adult, or a child.

Figure 1 of the annexed drawings is a side elevation, and Fig. 2 a back elevation showing a child's mail-cart constructed according to our invention in its preferred form.

$a\ a$ is the main framing of the vehicle, and $b\ b$ are the shafts formed in a piece therewith or fixed thereto.

$j\ j$ are stretchers or ties connecting together the sides of the framing $a\ a$.

$c\ c$ are the bearing-springs; $d$, the axle, and $e\ e$ the wheels.

$f\ f$ are front and rear seats, $g$ the back, and $h\ h$ the foot-steps. These parts are carried by an independent frame-work, which is constructed and suspended from the main framing $a\ a$ as follows: $i\ i$ are side bars or beams, forming the lower part of the independent frame-work. From these bars are carried up the front and rear bars $k\ k$, and these are connected at their upper ends by side bars $l\ l$, and intermediately by side bars $m\ m$, which support the seats. The bars $i\ i$ support the foot-steps $h\ h$. To the main framing we affix bearings $n\ n$ to receive the bent ends of cranked rods $p\ p$, which are held in place by bearings $q\ q$ on the under side of the side bars $i\ i$. These cranked rods, which are free to turn or rock in the bearings $n\ n$ and $q\ q$, suspend the bars $i\ i$ and the rest of the independent frame-work, together with the seats, back, and foot-steps, from the main framing $a\ a$, so that the independent frame-work will independently maintain its normal position, swinging with the cranked rods $p\ p$ on the main framing $a\ a$, irrespective of the height at which it is usually held by the person propelling the vehicle.

Although we prefer to employ cranked rods of the form shown in Figs. 1 and 2 by which to suspend the independent frame-work, it is not essential that these rods should be continuous from the bearing $n$ on the one side of the vehicle to the corresponding bearing $n$ on the other side. It will suffice if there is a rod or link from each bearing $n$ to the corresponding bearing $q$ on the same side of the vehicle. Instead of these bearings, other analogous devices may be employed for the rods or links to turn on or in.

The two cranked rods $p\ p$ are shown at a considerable angle to each other, being such as we think necessary to insure that the independent frame-work shall approximately maintain its normal position at the extreme height to which the shafts are likely to be lifted while the vehicle is being propelled. This angle may, however, be reduced if thought fit; but the nearer the two rods $p\ p$ approach the parallel the less will be the limit within which the independent frame work will approximately maintain its normal position, although it will still swing on the main framing $a\ a$.

As with our invention the independent suspended frame-work with the seats and the occupants can be practically balanced in all probable positions of the shafts, little or none of the weight comes upon the person propelling the vehicle. The front and rear bars *k k* are extended below the side bars, so as to form front and rear supports or stops *r r* to the framing *a a* when the vehicle is at rest and the shafts are lowered or raised to the full limit. In order to reduce or ease the shock in case the front stops *r r* come in contact with an obstruction while the vehicle is being propelled, the stops may be fitted with small wheels or rollers; or, one or more wheels or rollers may for the same purpose be fitted to the front foot-step *h*, these wheels in this case constituting the front stops or supports.

Figure 3:
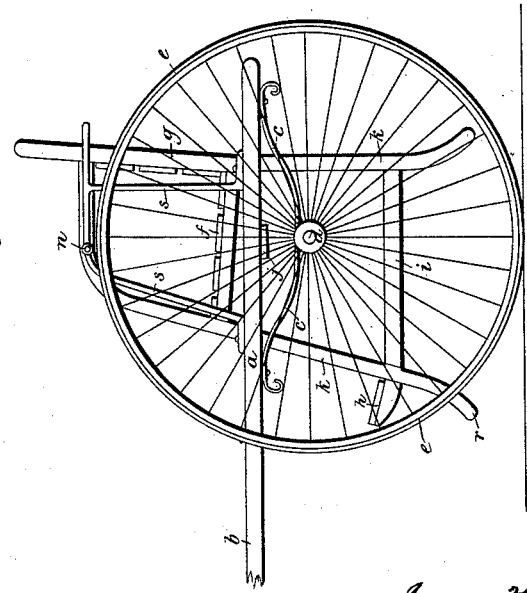

Fig. 3 represents in side elevation a modified construction in which the independent frame-work instead of being suspended by swinging cranked rods, as in Figs. 1 and 2, is hung or suspended from centers *n* in brackets or supports *s*, fixed to the main framing *a a*. The vehicle here illustrated has only a single seat. The same modified construction can be employed in vehicles with two seats; but in this case each seat would have a separate and independent body or frame-work, as shown in Fig. 4, and the seats would be arranged either back to back, as seen, or tandem fashion, as may be preferred. In this case we prefer to connect the two independent swinging bodies together by the beams or bars *i*, which are attached to the bars *k k* of the bodies, the beams *i* being free to turn on pins or centers *v v*, attached to the bodies and serving to keep them apart from each other, but not preventing their moving freely upon the centers *n n*, from which they are suspended. The foot-steps *h h* are carried by the beams *i*.

Figure 5:
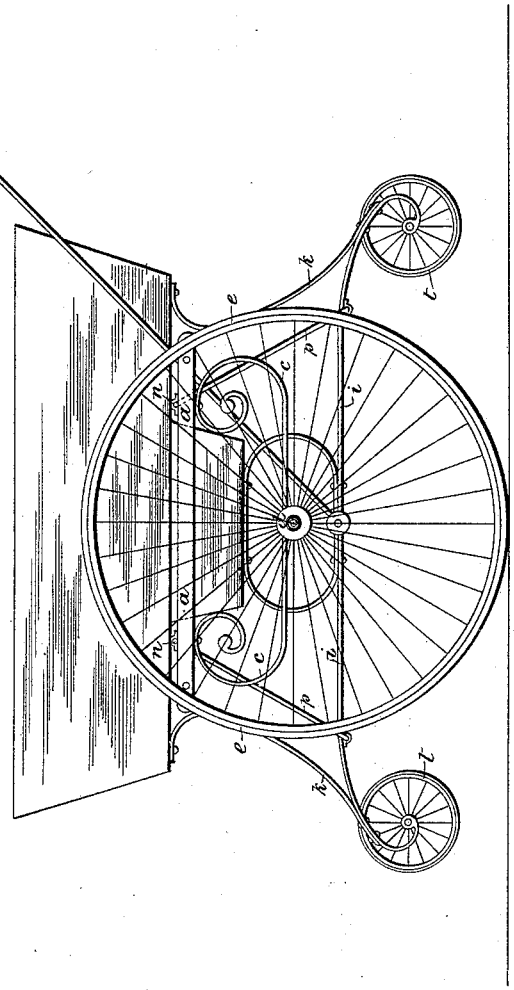

Although our invention is more particularly intended for the so-called "children's mail-carts," it is also applicable to two-wheeled perambulators. Its application to this purpose is represented in Fig. 5, in which it will be seen that the body of the perambulator is carried by an independent swinging frame. *t t* are wheels or rollers (or they may be plain supports or stops) to assist in supporting the vehicle when at rest. They do not touch the ground when the vehicle is being propelled.

What we claim, and desire to secure by Letters Patent, is—

1. In a child's mail-cart or two-wheeled perambulator, a separate or independent frame-work or body for that part of the vehicle which carries the child or children, the said frame-work or body being suspended from the main framing of the vehicle on each side by two suspending-rods arranged on opposite sides of its center of gravity and pivoted at their upper ends to the main framing of the vehicle and extending thence downwardly at diverging angles and pivoted at their lower ends to the said independent frame-work of the vehicle, whereby the part which carries the child or children maintains or approximately maintains its normal position notwithstanding any variation of the inclination or angle of the main framing, substantially as and for the purposes set forth.

2. In a child's mail-cart or two-wheeled perambulator, a separate or independent frame-work or body for that part of the vehicle which carries the child or children, in combination with suspending-rods by which said frame-work or body is suspended from the main framing of the vehicle, said rods being pivoted at their upper ends in bearings in the two sides of the main framing and at points above the axle thereof, and being pivoted at their lower ends by bearings in the lower part of said independent frame-work and at points below the axle of the vehicle, whereby the part which carries the child maintains approximately its normal position notwithstanding variations of the inclination of the main framing, substantially as and for the purposes set forth.

3. In a child's mail-cart, the combination, with the main framing *a a*, having the shafts *b b* rigidly attached thereto, of the side bars or beams *i i*, suspended or swung from said framing by the cranked rods *p p*, the said cranked rods, the bars *k k*, carried up from the bars *i i*, the side bars *m m*, the seats *f f*, supported by said side bars *m m*, and the foot-steps *h h*, supported by the bars *i i*, substantially as set forth and shown.

In witness whereof we have hereunto signed our names in the presence of two subscribing witnesses.

JAMES HONIBALL TOZER.
WILLIAM TOZER.

Witnesses:
GEORGE C. BACON,
THOMAS L. WHITEHEAD.